United States Patent
Tang et al.

(10) Patent No.: US 9,906,123 B2
(45) Date of Patent: Feb. 27, 2018

(54) CHARGE-PUMP AND DYNAMIC CHARGE-PUMP DEVICE INCLUDING THE SAME

(71) Applicant: REALTEK SEMICONDUCTOR CORP., Hsinchu (TW)

(72) Inventors: Wei-Cheng Tang, Zhubei (TW); Chih-Kang Chien, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 15/212,724

(22) Filed: Jul. 18, 2016

(65) Prior Publication Data

US 2017/0110960 A1    Apr. 20, 2017

(30) Foreign Application Priority Data

Oct. 15, 2015  (TW) .............................. 104133826 A

(51) Int. Cl.
*G05F 1/10* (2006.01)
*G05F 3/02* (2006.01)
*H02M 3/07* (2006.01)

(52) U.S. Cl.
CPC .................... *H02M 3/07* (2013.01)

(58) Field of Classification Search
CPC ....................................... H02M 3/07
USPC ......................................... 327/536
See application file for complete search history.

(56) References Cited

U.S. PATENT DOCUMENTS

| 5,680,300 | A  | * | 10/1997 | Szepesi | .................. | H02M 3/07 363/59 |
| 7,190,210 | B2 | * | 3/2007 | Azrai | ..................... | H02M 3/07 257/298 |
| 8,742,833 | B2 | * | 6/2014 | Hsu | ....................... | H02M 3/07 327/536 |
| 2008/0231347 | A1 | * | 9/2008 | Yen | ......................... | H02M 3/07 327/536 |
| 2009/0058505 | A1 | * | 3/2009 | Yoshio | ............... | H01M 10/425 327/535 |
| 2011/0012671 | A1 | * | 1/2011 | Chuang | .................. | H02M 3/07 327/536 |
| 2012/0001683 | A1 | * | 1/2012 | Wang | ..................... | H02M 3/07 327/536 |

(Continued)

*Primary Examiner* — Lincoln Donovan
*Assistant Examiner* — Metasebia Retebo
(74) *Attorney, Agent, or Firm* — Muncy, Geissler, Olds & Lowe, P.C.

(57) ABSTRACT

Disclosed is a charge-pump and a dynamic charge-pump device including the same. By switching the plurality of voltage sources, the output voltage of the charge-pump can be compensated, and changed output voltage of the charge pump is utilized to adjust a voltage as power source or ground source of a loading circuit. A detection circuit may further be included in the charge-pump for detecting the voltage or current of the loading circuit, and the minimum output voltage of the charge pump may be chosen to adjust the voltage-drop of the loading circuit, and the variation of the voltage of the loading circuit can be brought back within a predetermined range, such that the operational efficiency of the loading circuit may not be influenced. Moreover, the adjustment may be performed according to the different operation modes of the loading circuit, and the power consumption can be decreased.

10 Claims, 8 Drawing Sheets

(56) References Cited

U.S. PATENT DOCUMENTS

2014/0022006 A1* 1/2014 Lin .................. H02M 3/07
                                                                           327/536

\* cited by examiner

CHARGE-PUMP AND DYNAMIC CHARGE-PUMP DEVICE INCLUDING THE SAME

CROSS-REFERENCE TO RELATED APPLICATION

This application claims priority from Taiwan Patent Application No. 104133826, filed on Oct. 15, 2015, in the Taiwan Intellectual Property Office, the contents of which are hereby incorporated by reference in their entirety for all purposes.

BACKGROUND OF THE INVENTION

1. Field of the Invention

The present disclosure generally relates to a charge pump and a dynamic charge pump device including the same, and more particularly to a charge pump including a plurality of voltage sources, in which an output voltage of the charge pump may be compensated by switching between the plurality of voltage sources of the charge pump, and a voltage of a power source or a ground source of an external load circuit may be adjusted according to a variation of the output voltage of the charge pump.

2. Description of Related Art

A charge pump is a commonly used circuit structure capable of multiplying an input voltage to a high voltage through combinations of transistors and capacitors.

FIGS. 1A-1C are operational schematic diagrams of a conventional charge pump (CP).

The CP may generate a new voltage by utilizing a voltage source with a predetermined voltage and the principle that capacitors are capable of storing electric charges. The new voltage may be positive or negative. In FIG. 1A, first to a fourth switches S1-S4, a first capacitor C1, and a second capacitor C2 are arranged. The first voltage source V1 is connected to a first end of the first capacitor C1 through the first switch S1, the second voltage source V2 is connected to a second end of the first capacitor C1 through the second switch S2, and the first capacitor C1 and the second capacitor C2 are connected in parallel through the switches S3 and S4, respectively.

FIG. 1B illustrates a first operating phase (Phase 1) of CP, in which the first switch S1 and the second switch S2 are turned on, the third switch S3 and the fourth switch S4 are turned off, the first capacitor C1 is charged by both the first voltage source V1 and the second voltage source V2. FIG. 1C illustrates a second operating phase (Phase 2) of CP, in which the third switch S3 and the fourth switch S4 are turned on, the first switch S1 and the second switch S2 are turned off, the electric charges stored in the first capacitor C1 during the Phase 1 is distributed to the first capacitor C1 and the second capacitor C2.

After repeating Phase 1 and Phase 2 for several times, the capacitor C2 can be sufficiently charged, and a voltage V4(V3) different from the voltage V3(V4) may be obtained according to the initial voltage of the voltage source given to the voltage V3(V4). The voltages V3 and V4 can be positive or negative.

In application, the charge pump CP of FIGS. 1A-1C may be connected to a voltage source VDD at one end, and an output terminal of the charge pump CP is connected to a power supply terminal Vcp of a load circuit LC between an input terminal Vin and an output terminal Vout, as the charge pump CP shown in FIG. 1D. A load RL may draw current from the charge pump CP through the supply terminal Vcp when needed to maintain the stability of the load circuit LC, and different voltage drops at the supply terminal Vcp may generate according to the demand of the load circuit LC.

However, when the load RL demands a large amount of current, the load circuit LC may experience a large voltage drop. Under such a circumstance, the charge pump CP may not be able to supply enough output voltage to maintain the stability of the load circuit LC because the output voltage of the charge pump CP are not sufficient. The voltage at the supply terminal Vcp may drop affecting the efficiency of the load circuit LC, such as an increase of the total harmonic distortion (THD).

SUMMARY OF THE INVENTION

In view of the aforementioned technical problems, the primary objective of the present disclosure provides a charge pump. The charge pump includes a reference voltage switching unit, an input voltage source, a second switch, and a third switch. The reference voltage switching unit is connected to each of N reference voltage sources and a first end of a first capacitor. At least one of the N reference voltage sources charges the first capacitor via the first end when the reference voltage switching unit is turned on. None of the N reference voltage sources charges the capacitor when the reference voltage switching unit is turned off. N is larger or equal to two. The input voltage source is connected to a second end of the capacitor via a first switch. The second switch is connected between a first node and a first end of a second capacitor, the first node is positioned between the reference voltage switching unit and the first capacitor. The third switch is connected between a second node and a second end of the second capacitor, and the second node is positioned between the first switch and the first capacitor. The charge pump may have first and second operating modes. In the first operating mode, the reference voltage switching unit receives a control signal to be turned on while the first switch is turned on, and both the second and the third switches are turned off to charge the first capacitor. In the second operating mode, the reference voltage switching unit receives the control signal to be turned off, the first switch is turned off, and both the second and the third switches are turned on, and the second capacitor is being charged by repeating the first and the second operating modes until an output terminal of the second capacitor reaches a predetermined potential. The predetermined potential is converted into an output voltage in the second operating mode.

Preferably, the charge pump further includes a detection circuit. The detection circuit is configured to detect whether a variation of voltage or current supplied a load circuit connected to the charge pump exceeds a predetermined range while the charge pump is connected to a load circuit. If yes, the detection circuit transmits a controlling signal to control the reference voltage switching unit, the first, the second, and the third to be switched between the first and the second operating modes, and the charge pump supply the output voltage to the load circuit to adjust the variation of voltage or current.

Preferably, the predetermined range includes threshold ranges corresponding to each of the N reference voltage sources. The detection circuit is further configured to detect whether the variation of voltage or current of the load circuit connected to the charge pump reaches one of the threshold ranges. If yes, the controlling signal is generated to control the reference voltage switching unit, such that the corresponding at least one of the N reference voltage source charges the first capacitor via the end of the first capacitor, and the output voltage of the charge pump is supplied to the load circuit to adjust the variation of voltage or current supplied the load circuit.

Preferably, after the output voltage of the charge pump is supplied to the load circuit to adjust the variation of voltage or current, the detection circuit is further configured to detect whether the variation of voltage or current of the load circuit reaches the predetermined range within a predetermined time period. If, no, the controlling signal is generated to control the reference voltage switching unit, such that at least one of the N reference voltage sources charges the first capacitor via the first end of the first capacitor, and the output voltage of the charge pump supplied to the load circuit is increased to adjust the variation of voltage or current supplied to the load circuit.

Preferably, after the output voltage of the charge pump is supplied to adjust the variation of voltage or current of the load circuit, the detection circuit is further configured to detect whether the variation of voltage or current with time unit exceeds a predetermined value. If no, the controlling signal is generated to control the reference voltage switching unit, such that at least one of the N reference voltage sources charges the first capacitor via the first end of the first capacitor, and that the output voltage of the charge pump supplied to the load circuit is increased to adjust the variation of voltage or current supplied to the load circuit.

Preferably, when the charge pump is connected to a source terminal of the load circuit, the output voltage of the charge pump is positive or larger than the ground source of the load circuit and adjusts the voltage supplied to the load circuit, and when the charge pump is connected to a ground terminal of the load circuit, the output voltage of the charge pump is negative or smaller than the power source of the load circuit and adjusts the voltage of the load circuit.

A dynamic charge pump device adapt to a load circuit connected to a load is also disclosed in the present disclosure. The dynamic charge pump device includes the charge pump as described above. The detection circuit unit is respectively connected to the load circuit and the charge pump and detects whether a variation of voltage or current supplied to the load circuit exceed a predetermined range. If yes, the detection circuit transmits a controlling signal to control the reference voltage switching unit, the first, the second, and the third switches to be switched between the first and the second operating modes, and the output voltage of the charge pump is supplied to the load circuit to adjust the variation of voltage or current supplied to the load circuit.

Preferably, the predetermined range includes a plurality of threshold ranges corresponding to each of the N reference voltage sources. The detection circuit is configured to detect whether the variation of voltage or current is within one of the threshold ranges, if yes, the controlling signal is generated to control the reference voltage switching unit, such that the corresponding at least one of the N reference voltage sources charges the first capacitor via the end of the first capacitor, and the output voltage of the charge pump is supplied to the load circuit to adjusts the variation of voltage or current supplied to the load circuit.

Preferably, after the output voltage of the charge pump is supplied to the load circuit to adjust the variation of voltage or current supplied to the load circuit, the detection circuit is further configured to detect whether the variation of voltage or current supplied to the load circuit reaches the predetermined range within a predetermined time period. If no, the controlling signal is generated to control the reference voltage switching unit such that at least one of the N reference voltage sources charges the first capacitor via the first end of the first capacitor, and that the output voltage of the charge pump to the load circuit is increased to adjust the variation of voltage or current supplied to the load circuit.

Preferably, after the output voltage of the charge pump is supplied to adjust the variation of voltage or current of the load circuit, the detection circuit is further configured to detect whether the variation of voltage or current with time exceeds a predetermined value. If no, the controlling signal is generated to control the reference voltage switching unit, such that at least one of the N reference voltage sources charges the first capacitor via the first end of the first capacitor, and that the output voltage of the charge pump supplied to the load circuit is increased to adjust the variation of voltage or current supplied to the load circuit.

By way of summary, a charge pump and a dynamic charge pump includes N numbers of reference voltage sources, and a reference voltage switching unit controlled by a control signal is disclosed, in which the output voltage of the charge pump can be adjusted according to demands. The charge pump further includes a detection circuit configured to detect voltages or currents of a load circuit. By choosing the minimum output voltage of the charge pump, the voltage or the current of the load circuit can be adjusted to be within a predetermined range. Thereby the efficiency of the load circuit is not affected. Furthermore, the load circuit can be adjusted dynamically under different operating modes so that the power consumption may be reduced.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawing, like reference numerals designate corresponding parts throughout the several views.

DETAILED DESCRIPTION OF THE PREFERRED EMBODIMENTS

It is to be further understood that even though numerous characteristics and advantages of the present embodiments have been set forth in the following description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

It is further understood that the usage of "and/or" in the present disclosure includes any or all combinations of one or more of the associated elements thereof, and that the usage of "at least one" of the narrative prefix before a list of elements, the list of elements as a whole is referred to, rather than an individual element of the list.

Figure 1A:
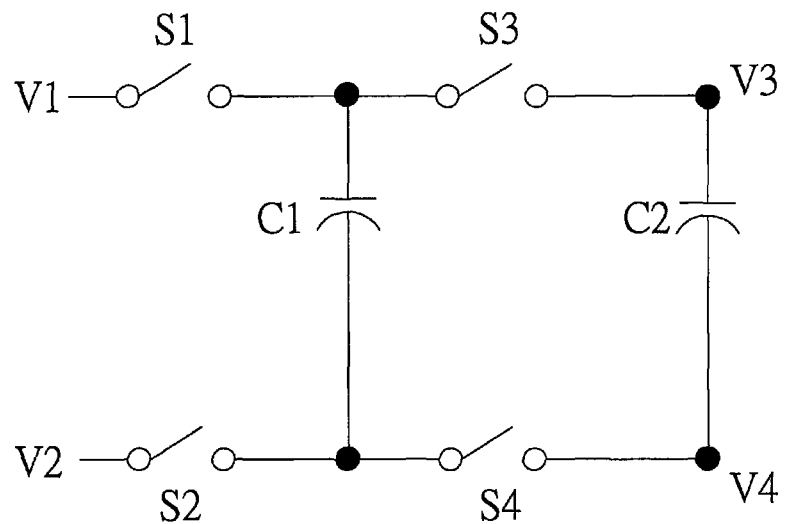
FIGS. 1A-1D are operational schematic diagrams of the conventional charge pump.
Figure 1B:
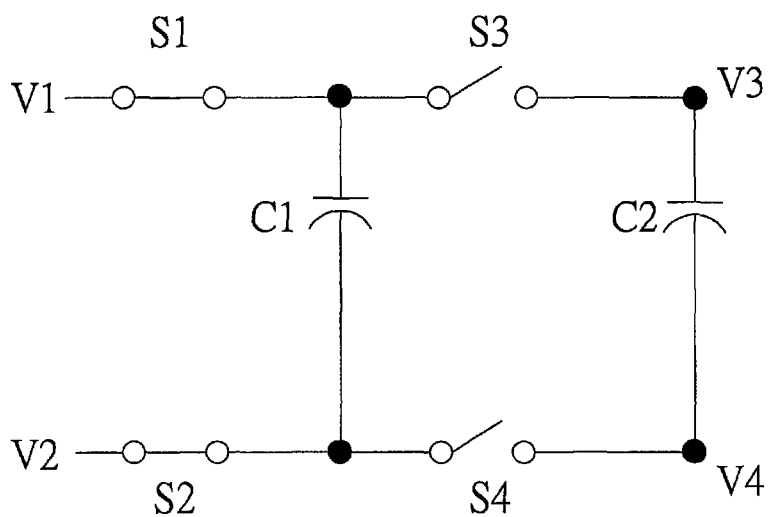
Figure 1C:
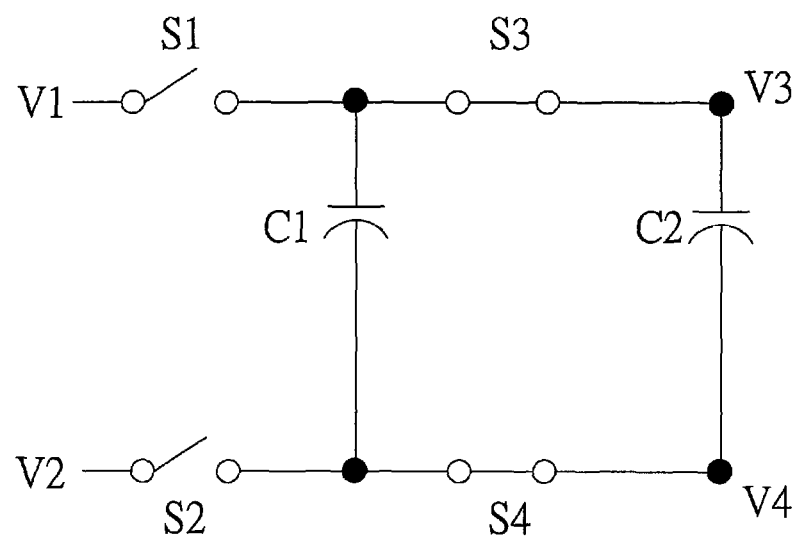
Figure 1D:
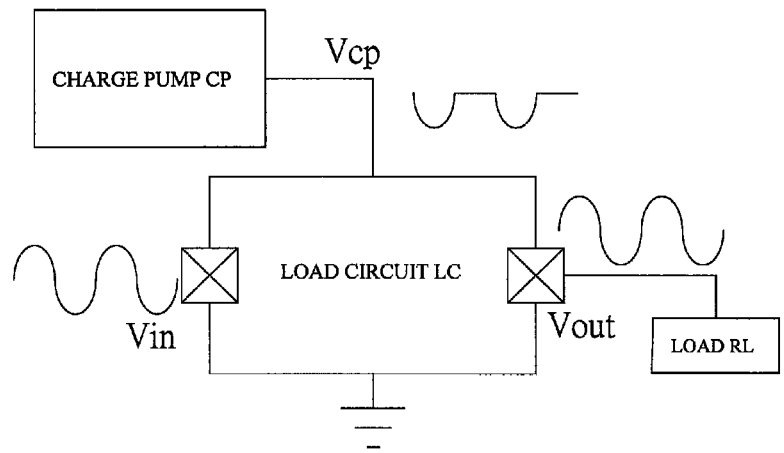
Figure 2:
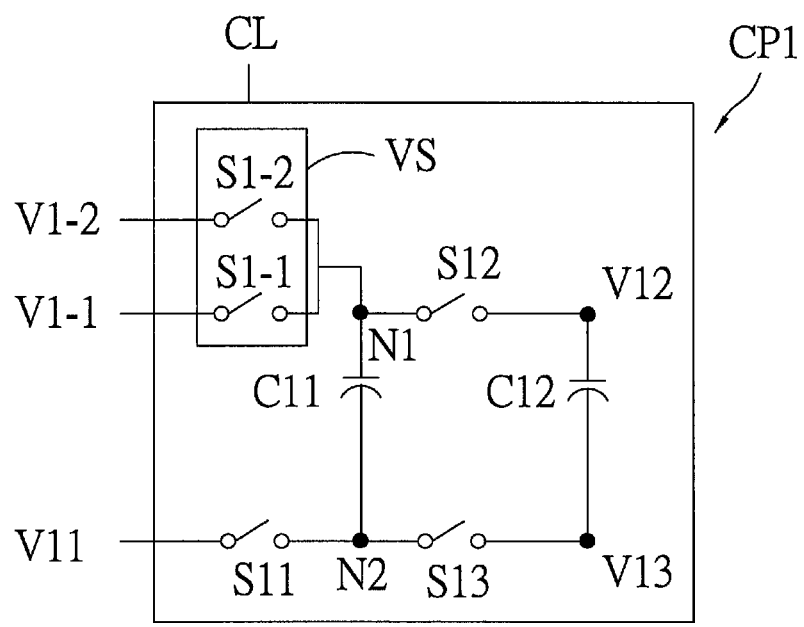
FIG. 2 is a circuit layout of a charge pump according to a first embodiment of the present disclosure.

Detailed descriptions of the drawings are described below. FIG. 2 is a circuit layout of the charge pump according to the first embodiment of the present disclosure. The charge pump includes a reference voltage switching unit VS, a first reference voltage V1-1, a second reference voltage V1-2, a first capacitor C11, a second capacitor C12, a first switch S11, a second switch S12, and a third switch S13. The reference voltage switching unit VS is connected between the first reference voltage V1-1, the second reference voltage V1-2 and a first end of the first capacitor C11. When the reference voltage switching unit VS is turned on, one of the first reference voltage V1-1 and the second reference voltage V1-2 charges the first capacitor C11 via the first end. When the reference voltage switching unit VS is turned off, none of the first reference voltage V1-1 or the second reference voltage V1-2 charges the first capacitor C11. Preferably, the reference voltage switching unit VS includes a first voltage switch S1-1 and a second voltage switch S1-2, and one of the first reference voltage V1-1 and the second reference voltage V1-2 may charge when the reference voltage switching unit VS is turned on according to a control signal CL, and the reference voltage switching unit VS may be switched between on and off. Preferably, the reference voltage switching unit VS is a multiplexer.

As shown in FIG. 2, an input voltage source V11 is connected to a second end of the first capacitor C11 via the first switch S11, the second switch S12 is connected to a first end of the second capacitor C12 and a first node N1 between the reference voltage switching unit VS and the first capacitor C11, the third switch S13 is connected to a second node N2 and a second end of the second capacitor C12.

The charge pump CP1 as shown in FIG. 2 may have two operating modes. In a first operating mode, the reference voltage switching unit VS is turned on by the control signal CL, the first switch S11 is turned on, both the second switch S12 and the third switch S13 are turned off, and the first capacitor C11 is being charged. In a second operating mode, the reference voltage switching unit VS is turned off by the control signal CL, the first switch S11 is turned off, both the second switch S12 and the third switch S13 are turned on, and the second capacitor C12 is charged by the charged first capacitor C11.

By repeating the first and the second operating modes, the second capacitor C12 may be sufficiently charged such that potentials V12 and V13 at both ends of the second capacitor C12 are stable in the second operating mode. When the potential difference between the voltages V12 and V13 reaches a predetermined value under the second operating mode, the predetermined potential may be converted into an output voltage. Furthermore, the different potentials V12 (V13) may be obtained according to the initial voltage of the voltage source given to the potential V13(V12). The output voltages of the charge pump can be positive or negative. Furthermore, a potential difference between the potentials V12 and V13 may vary as the reference voltage chosen according to the control signal CL, that is, one of the reference voltages V1-1 or V1-2. Thus the output voltage of the charge pump CP1 connected to the first capacitor C11 may be changed by changing the control signal CL such that the voltage potential across the second capacitor C12 may also be changed. Thus, the output voltage of the charge pump CP1 may be adjusted according to requirement.

Figure 3:
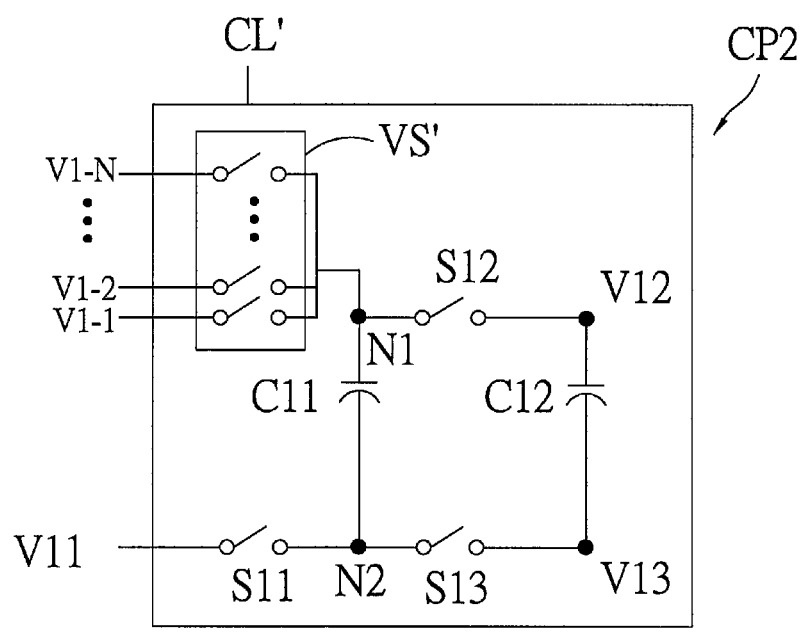
FIG. 3 is a circuit layout of the charge pump according to a second embodiment of the present disclosure.

Please refer to FIG. 3, which is a circuit layout of the charge pump according to the second embodiment of the present disclosure. As shown in FIG. 3, elements denoted with similar symbols represent elements with similar functions. The charge pump CP2 according to the second embodiment differs from that of the first embodiment in that the voltage switching unit VS' of the charge pump CP2 is connected between the first to the Nth reference voltage V1-1 to V1-N and a first end of the first capacitor C11. Therefore, when the reference voltage switching unit VS' is turned on, at least one of the first to the Nth reference voltage V1-1~V1-N supplies voltage to the charge pump CP2 according to a control signal CL'. In the first operating mode, at least one of the first to the Nth reference voltage V1-1~V1-N chosen by the control signal CL' is supplied to the charge pump CP2. In this case, the first capacitor C11 is being charged by the chosen reference voltage and the input voltage source V11. In the second operating mode, the control signal CL' turns off the reference voltage switching unit VS', in addition the first switch S11 is turned off, and both the second switch S12 and the third switch S13 are turned on. Hence the second capacitor C12 is being charged by the charged first capacitor C11. By repeating the first and the second operating modes, the second capacitor C12 may be sufficiently charged such that the potential difference between both ends of the second capacitor C12 may be stable. When the potential difference between both ends (potentials V12 and V13) of the second capacitor C12 reaches a predetermined value under the second operating mode, the predetermined potential may be converted into an output voltage. The potential difference between the voltages V12 and V13 may by changed depending on which one(s) of the N reference voltages the control signal CL' chooses to turn on. Thus, the output voltage of the charge pump CP2 may be adjusted according to requirement. For example, a voltage may be given to one of the potentials V12 and V13, if the voltage is given to the potential V12, the potential V13 may be served as an output terminal for voltage output, and vice versa. The output voltages of the charge pump can be positive or negative.

Figure 4A:
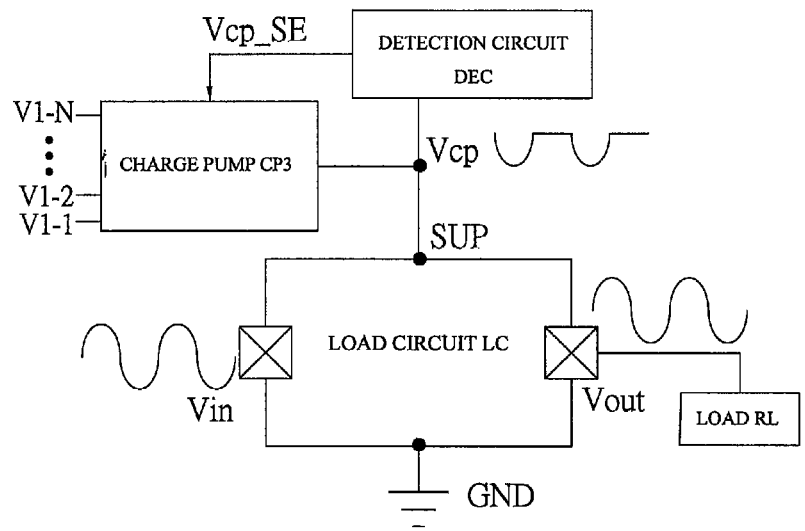
FIG. 4A is a circuit layout of the charge pump according to a third embodiment of the present disclosure.
Figure 4B:
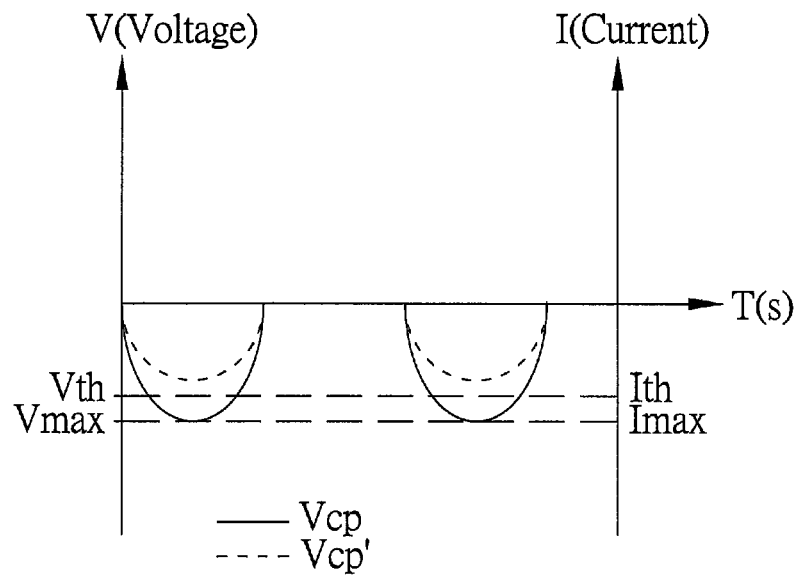
FIG. 4B is a diagram showing dynamic voltages and currents at a node Vcp of the charge pump of FIG. 4A.

Please refer to FIG. 4A, which is a circuit layout of the charge pump according to a third embodiment of the present disclosure. As shown in FIG. 4A, a charge pump CP3 is further connected to a detection circuit DEC. The charge pump CP3 may correspond to the charge pump CP1 or the charge pump CP2 of the above illustrated embodiment, and the first to the Nth reference voltages V1-1~V1-N as a voltage source, the charge pump CP3 may be connected to a power supply terminal SUP of a load circuit LC. The load circuit LC may be connected between an input terminal Vin and an output terminal Vout, and supplies power to a load RL. A waveform of dynamic input voltages Vcp is shown in FIG. 4B, in which the detection circuit DEC monitors a voltage drop of the load circuit LC when the load RL increases. In other words, the detection circuit DEC detects whether the voltage or the current at a node Vcp exceeds a predetermined range Vth. If yes, the detection circuit DEC transmits a control signal Vcp_SE to the charge pump CP3, to control the reference voltage switching unit, the first switch, the second switch, and the third switch to repeat the first and the second operation modes and supply the output voltage to adjust the voltage drops caused by the load circuit LC. Furthermore, the control signal Vcp_SE may control the voltage switching unit according to the variation of the voltage or the current at the node Vcp, to choose the most suitable reference voltage from the N reference voltages such that a minimum output voltage of the charge pump is obtained to bring the voltage or the current at the node Vcp within the predetermined range Vth, thereby the efficiency of the load circuit LC may not be affected. The charge pump CP3 supplies positive voltages according to the present embodiment.

FIG. 4B is a diagram showing dynamic voltages and currents with time at the node Vcp of the charge pump CP3, Vcp/Vcp' being without/with adjustments. When the load circuit LC experiences the voltage drop which exceeds the predetermined range Vth, the detection circuit DEC detects that the voltage drop at the node Vcp exceeds the predetermined range Vth, calculates a difference between a maximum voltage decrease Vmax and the Vth, and transmits the control signal Vcp_SE based on the difference. Alternatively, when the detection circuit DEC detects that the load circuit LC is consuming an current exceeding a predetermined range Ith, the detection circuit DEC calculates a difference between a maximum current Imax and the predetermined range Ith, then transmits the control signal Vcp_SE based on the difference between Imax and Ith, and chooses the most suitable reference voltage from the N reference voltages such that a minimum output voltage of the charge pump is obtained to bring the current at the node Vcp within the predetermined range Ith, thereby the efficiency of the load circuit LC may not be affected and the power consumption may be decreased.

Figure 4C:
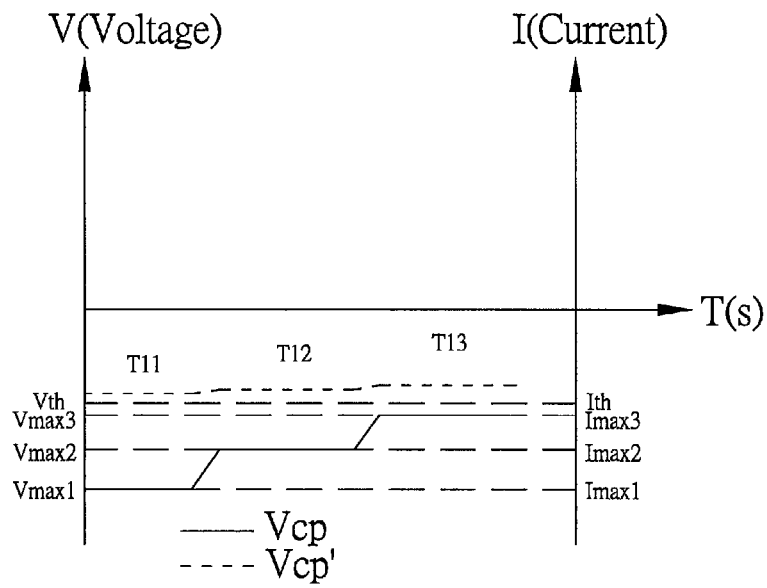
FIG. 4C is a diagram showing dynamic voltages and currents at the node Vcp of the charge pump of FIG. 4A according to another embodiment.

FIG. 4C is a diagram showing dynamic voltages and currents at the node Vcp of the charge pump of FIG. 4A, Vcp/Vcp' being without/with adjustments according to another embodiment. In the present embodiment, the charge pump CP3 includes three reference voltages, i.e., N=3, and the load circuit LC has three operating modes: a heavy load mode T11, a normal mode T12, and a power saving mode T13, in which the load circuit LC has a light load. In FIG. 4C, maximum voltages Vmax1, Vmax2, and Vmax3 of the heavy load mode T11, the normal mode T12, and the efficient mode T13, respectively, all exceed the predetermined range Vth. The detection circuit DEC detects that the voltage drops exceeds the predetermined range Vth, and calculates differences between the maximum voltages Vmax1, Vmax2, Vmax3 and the Vth, respectively, then transmits the control signal Vcp_SE based on the differences, and chooses the most suitable reference voltage from the three reference voltages V1-1, V1-2, V1-3, where V1-1>V1-2>V1-3, such that a minimum output voltage of the charge pump is obtained to bring the voltage at the node Vcp within the predetermined range Vth. Alternatively, when the detection circuit DEC detects that the load circuit LC is consuming the currents which exceeds a predetermined range Ith, the detection circuit DEC calculates differences between maximum currents Imax1, Imax2, Imax3 and the Ith, respectively, then transmits the control signal Vcp_SE based on the differences, and chooses the most suitable reference voltage from the three reference voltages such that a minimum output voltage of the charge pump is obtained to bring the current at the node Vcp within the predetermined range Ith, thereby the efficiency of the load circuit LC may not be affected by the voltage drops and the consumed currents, and the power consumption may be decreased according to the operation mode of the load circuit.

Figure 5A:
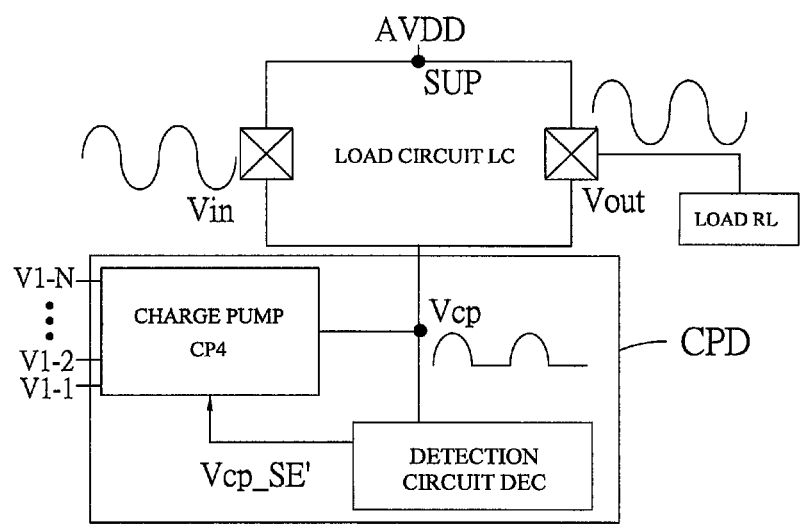
FIG. 5A is a circuit layout of a dynamic charge pump device according to a fourth embodiment of the present disclosure.
Figure 5B:
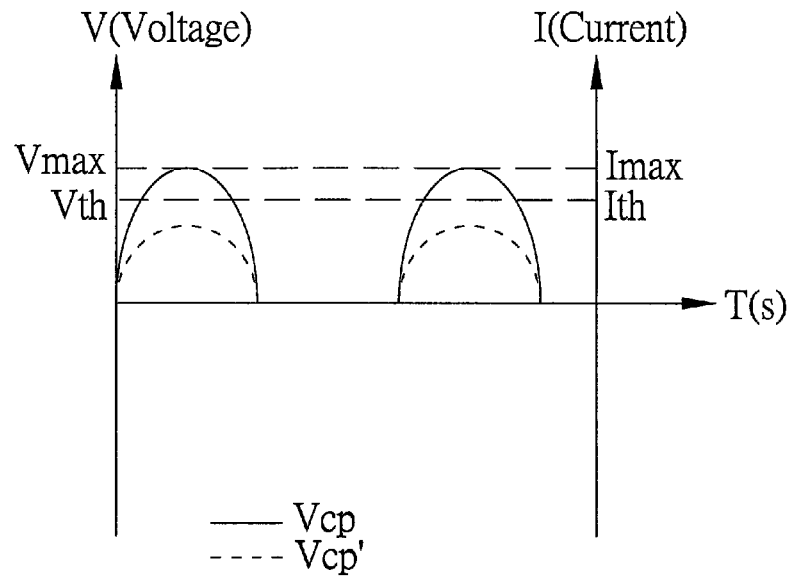
FIG. 5B is a diagram showing dynamic voltages and currents at a node Vcp of the dynamic charge pump device of FIG. 5A.

FIG. 5A is a circuit layout of a dynamic charge pump device CPD according to the fourth embodiment of the present disclosure. The dynamic charge pump CPD includes a charge pump CP4 connecting to a detection circuit DEC. The charge pump CP4 may utilize the charge pump CP1 or the charge pump CP2 of the above illustrated embodiment, and the first to the Nth reference voltages V1-1~V1-N as a voltage source. The charge pump 4 is connected to a ground GND of the load circuit LC, a voltage supply source AVDD is connected to the power supply terminal of the load circuit LC. Similarly, the load circuit LC may be connected between the input terminal Vin and the output terminal Vout, and supplies power to a load RL. A waveform of the dynamic input voltages Vcp is shown in FIG. 5B, in which the detection circuit DEC monitors a voltage or a current of the load circuit LC, that is, the detection circuit DEC detects whether the variation of the voltage or the current at a node Vcp exceeds a predetermined range. If yes, the detection circuit DEC transmits a control signal Vcp_SE to the charge pump CP4, to control the reference voltage switching unit, the first switch, the second switch, and the third switch to repeat the first and the second operation modes and supplies the output voltage to the load circuit LC thereby adjusting the variation of the voltage or the current supplied to the load circuit LC.

FIG. 5B is a diagram showing dynamic voltages and currents with time at a node Vcp of the dynamic charge pump device of FIG. 5A, Vcp/Vcp' being without/with adjustments. The charge pump CP4 supplies negative voltages according to the present embodiment. When the load circuit LC experiences the voltage drop which exceeds the predetermined range Vth, the detection circuit DEC detects that the voltage drop at the node Vcp exceeds the predetermined range Vth, calculates a difference between the maximum voltage decrease Vmax and the Vth, and transmits the control signal Vcp_SE based on the difference. Alternatively, when the detection circuit DEC detects that the load circuit LC is consuming an electric current which exceeds the predetermined range Ith, the detection circuit DEC calculates a difference between the maximum current Imax and the Ith, transmits the control signal Vcp_SE based on the difference between Imax and Ith. Furthermore, the detection circuit DEC chooses the most suitable reference voltage from the N reference voltages such that a minimum output voltage of the charge pump is obtained to bring the voltage or the current at the node Vcp within the predetermined range Vth or Ith, respectively, thereby the efficiency of the load circuit LC may not be affected by the voltage drop and the power consumption may be decreased.

Figure 5C:
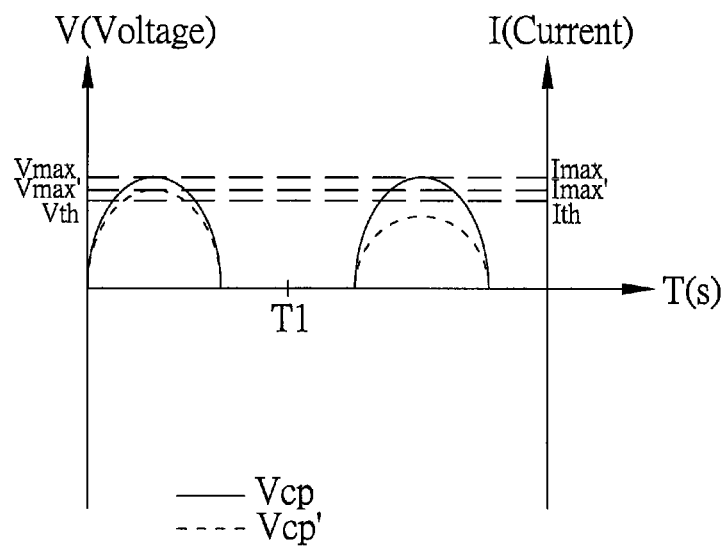
FIG. 5C is a diagram showing dynamic voltages and currents at a node Vcp of the dynamic charge pump device of FIG. 5A according to another embodiment.

FIG. 5C is a diagram showing dynamic voltages and currents with time at the node Vcp of the dynamic charge pump device of FIG. 5A, Vcp/Vcp' being without/with adjustments according another embodiment. When the load circuit LC experiences the voltage drop which exceeds the predetermined range Vth, the detection circuit DEC detects that the voltage drop at the node Vcp exceeds the predetermined range Vth, calculates a difference between the maximum voltage decrease Vmax and the Vth, and transmits the control signal Vcp_SE based on the difference. Alternatively, when the detection circuit DEC detects that the load circuit LC is consuming an electric current which exceeds the predetermined range Ith, the detection circuit DEC calculates a difference between the maximum current Imax and the Ith, transmits the control signal Vcp_SE based on the difference between Imax and Ith. Furthermore, the detection circuit DEC chooses the most suitable reference voltage from the N reference voltages such that a minimum output voltage of the charge pump is obtained to bring the voltage or the current at the node Vcp within the predetermined range Vth or Ith, respectively. Because the load circuit LC may be temporarily unstable which may, in turn, cause a further voltage drop, in addition to what is described above in FIG. 5B, the detection circuit DEC further detects whether the adjusted voltage or the adjusted current of Vcp' returns to the predetermined range Vth or Ith, respectively, within a predetermined time period T1. If not, the detection circuit DEC calculates a difference between an adjusted maximum voltage Vmax' and the predetermined range Vth, or alternatively calculates a difference between an adjusted maximum current Imax' and the predetermined range Ith, transmits another control signal Vcp_SE based on the difference between Vmax' and Vth, or Imax' and Ith, and chooses the most suitable reference voltage from the N reference voltages such that a minimum output voltage of the charge pump is obtained to bring the voltage or the current at the node Vcp within the predetermined range Vth or Ith. Thereby the output voltage of the charge pump or the output current of the charge pump may be monitored dynamically, and the efficiency of the load circuit LC may not be affected due to the fluctuations of the voltage or current, as a result, the power consumption may be reduced.

Figure 5D:
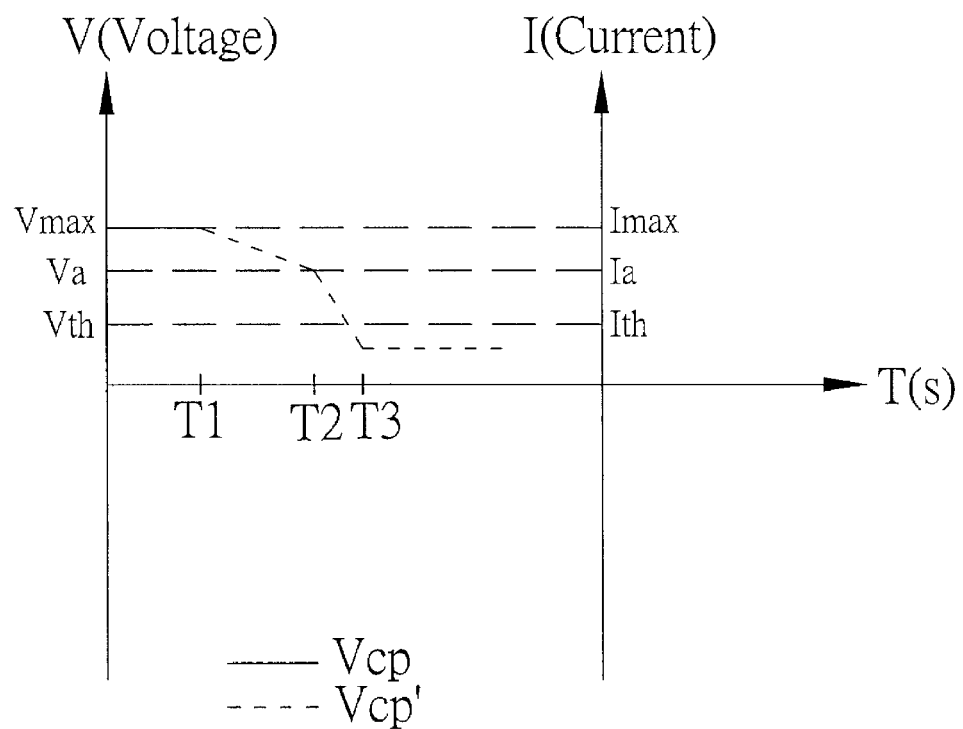
FIG. 5D is a diagram showing dynamic voltages and currents at a node Vcp of the dynamic charge pump device of FIG. 5A according to yet another embodiment.

FIG. 5D is a diagram showing dynamic voltages and currents at a node Vcp of the dynamic charge pump device of FIG. 5A, Vcp/Vcp' being without/with adjustments according to yet another embodiment. As shown in FIG. 5D, the load circuit LC experiences a voltage drop which exceeds the predetermined range Vth, the detection circuit DEC detects the voltage decrease still exceeds the predetermined range Vth after the time period T1; the detection circuit DEC then calculates the difference between the maximum voltage decrease Vmax and the predetermined Vth. Alternatively, the load circuit LC experiences a current decrease exceeding the predetermined range Ith, the detection circuit DEC detects the current decrease still exceeds the predetermined range Ith after the time period T1, the detection circuit DEC calculates the difference between the maximum current decrease Imax and the predetermined Vth. The detection circuit DEC transmits control signal Vcp_SE based on the difference between Vmax' and Vth, or Imax' and Ith, and chooses the most suitable reference voltage from the N reference voltages such that a minimum output voltage of the charge pump is obtained to bring the voltage or the current of the adjusted node Vcp' within a predetermined range Vth or Ith. However, the time that the voltage change of the load circuit LC may be too long so it is necessary to eliminate the effects of the voltage change or the current change as soon as possible. As such, the detection circuit DEC may determine the voltage change or the current change reaches a predetermined value within a predetermined time period. In the present embodiment, the detection circuit DEC determines a difference between the maximum voltage Vmax and a voltage Va at the time T2, or a difference between the maximum current Imax and a current Ia at the time T2. A rate of voltage change or a rage of current change is calculated by dividing (Vmax−Va) or (Imax−Ia) by T2-T1, respectively. It is then determined if the rate of voltage change or the rate of current change is within a predetermined value. If not, the detection circuit DEC transmits another control signal Vcp_SE to increase the output voltage of the charge pump CP4 so as to increase the rate of voltage change or the rate of current change. The above described processes are repeated until the adjusted voltage Vcp' falls within the predetermined range Vth or the current falls within the predetermined range Ith at time T3. At time T3, the detection circuit generates yet another control signal Vcp_SE and chooses the most suitable reference voltage from the N reference voltages to decrease the output voltage of the charge pump CP4 and to decrease energy waste. Thereby the output voltage of the charge pump or the output current of the charge pump may be monitored dynamically, and the efficiency of the load circuit LC may not be affected for a long period of time because of fluctuations of the voltage or current.

In summary, a charge pump and a dynamic charge pump includes N numbers of reference voltage sources, and a reference voltage switching unit controlled by a control signal is disclosed, in which the output voltage of the charge pump can be adjusted according to requirements. The charge pump further includes a detection circuit configured to detect voltages or currents of a load circuit. By choosing the minimum output voltage of the charge pump, the voltage or the current of the load circuit can be adjusted to be within a predetermined range. Thereby the efficiency of the load circuit is not affected. Furthermore, the load circuit can be adjusted dynamically under different operating modes so that the power consumption may be reduced.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A charge pump comprising:
   a reference voltage switching unit connected to each of N reference voltage sources and a first end of a first capacitor, wherein at least one of the N reference voltage sources charges the first capacitor via the first end when the reference voltage switching unit is turned on, and none of the N reference voltage sources charges the capacitor when the reference voltage switching unit is turned off, and N≥2;
   an input voltage source connected to a second end of the capacitor via a first switch;
   a second switch connected between a first node and a first end of a second capacitor, the first node being positioned between the reference voltage switching unit and the first capacitor; and
   a third switch connected between a second node and a second end of the second capacitor, the second node being positioned between the first switch and the first capacitor; wherein
   in a first operating mode, the reference voltage switching unit receives a control signal to be turned on while the first switch is turned on and both the second and the third switches are turned off to charge the first capacitor,
   in a second operating mode, the reference voltage switching unit receives the control signal to be turned off while the first switch is turned off and both the second and the third switches are turned on, such that the second capacitor is charged by the charged first capacitor, and
   after one of the first and second ends of the second capacitor reaches a predetermined potential by repeating the first and the second operating modes, the predetermined potential is converted into an output voltage in the second operating mode.

2. The charge pump as in claim 1, further comprising a detection circuit, wherein, the detection circuit is configured to detect whether a variation of voltage or current supplied to a load circuit connected to the charge pump exceeds a predetermined range while the charge pump is connected to a load circuit, if the variation of voltage or current exceeds the predetermined range, the detection circuit transmits a controlling signal to control the reference voltage switching unit, the first switch, the second switch, and the third switch to repeat the first and the second operating modes, and to supply the output voltage to the load circuit so as to adjust the variation of voltage or current of to the load circuit.

3. The charge pump as in claim 2, wherein the predetermined range comprises a plurality of threshold ranges corresponding to each of the N reference voltage sources, the detection circuit is further configured to detect whether the variation of voltage or current of the load circuit connected to the charge pump is within one of the threshold ranges, if yes, the controlling signal is generated to control the reference voltage switching unit, such that the corresponding at least one of the N reference voltage sources charges the first capacitor via the first end of the first capacitor, and the output voltage of the charge pump is supplied to the load circuit to adjust the variation of voltage or current of the load circuit.

4. The charge pump as in claim 2, wherein after the output voltage of the charge pump is supplied to adjust the variation of voltage or current output to the load circuit, the detection circuit is further configured to detect whether the variation of voltage or current of the load circuit is adjusted to be within the predetermined range in a predetermined time period, if no, the controlling signal is generated to control the reference voltage switching unit, such that at least one of the N reference voltage sources charges the first capacitor via the first end of the first capacitor, and the output voltage to the load circuit is increased to adjust the variation of voltage or current supplied to the load circuit.

5. The charge pump as in claim 2, wherein after the output voltage of the charge pump is supplied to adjust the variation of voltage or current supplied to the load circuit, the detection circuit is further configured to detect whether a variation of voltage or current with time exceeds a predetermined value, if the variation of voltage or current with time does not exceed the predetermined value, the controlling signal is generated to control the reference voltage switching unit, such that at least one of the N reference voltage sources charges the first capacitor via the first end of the first capacitor, and that the output voltage of the charge pump supplied to the load circuit is increased to adjust the variation of voltage or current supplied to the load circuit.

6. The charge pump as in claim 2, wherein when the charge pump is connected to a source terminal of the load circuit, the output voltage of the charge pump is positive or larger than the ground source of the load circuit and configured to adjust the voltage supplied to the load circuit, and when the charge pump is connected to a ground terminal of the load circuit, the output voltage of the charge pump is negative or smaller than the power source of the load circuit and configured to adjust the voltage of the load circuit.

7. A dynamic charge pump device adapted to a load circuit connected to a load, the dynamic charge pump device comprising:
a charge pump comprising:
a reference voltage switching unit connected to each of N reference voltage sources and a first end of a first capacitor, wherein at least one of the N reference voltage sources charges the first capacitor via the first end when the reference voltage switching unit is turned on, and none of the N reference voltage sources charges the capacitor when the reference voltage switching unit is turned off, and N≥2;
an input voltage source connected to a second end of the capacitor via a first switch;
a second switch connected between a first node and a first end of a second capacitor, the first node being positioned between the reference voltage switching unit and the first capacitor; and
a third switch connected between a second node and a second end of the second capacitor, the second node being positioned between the first switch and the first capacitor, wherein
in a first operating mode, the reference voltage switching unit receives a control signal to be turned on while the first switch is turned on, and both the second and the third switches are turned off to charge the first capacitor,
in a second operating mode, the reference voltage switching unit receives the control signal to be turned off while the first switch is turned off, and both the second and the third switches are turned on, such that the second capacitor is charged by the charged first capacitor,
after one of the first and second ends of the second capacitor reaches a predetermined potential by repeating the first and the second operating modes, the predetermined potential is converted into an output voltage of the charge pump in the second operating mode, and the output voltage of the charge pump is supplied to the load circuit; and
a detection circuit unit respectively connected to the load circuit and the charge pump, wherein the detection circuit is configured to detect whether a variation of voltage or current supplied to the load circuit exceeds a predetermined range, if yes, the detection circuit transmits a controlling signal to control the reference voltage switching unit, the first, the second, and the third switches to be switched between the first and the second operating modes, and the output voltage of the charge pump is supplied to the load circuit to adjust the variation of voltage or current supplied to the load circuit.

8. The dynamic charge pump device as in claim 7, wherein the predetermined range comprises a plurality of threshold ranges corresponding to each of the N reference voltage sources, the detection circuit is further configured to detect whether the variation of voltage or current is within one of the threshold ranges, if yes, the controlling signal is generated to control the reference voltage switching unit, such that the corresponding at least one of the N reference voltage sources charges the first capacitor via the first end of the first capacitor, and the output voltage of the charge pump is supplied to the load circuit to adjust the variation of voltage or current of the load circuit.

9. The dynamic charge pump device as in claim 7, wherein after the output voltage of the charge pump is supplied to adjust the variation of voltage or current supplied to the load circuit, the detection circuit is further configured to detect whether the variation of voltage or current of the load circuit reaches the predetermined range in a predetermined time period, if no, the controlling signal is generated to control the reference voltage switching unit such that at least one of the N reference voltage sources charges the first capacitor via the first end of the first capacitor, and that the output voltage of the charge pump to the load circuit is increased to adjust variation of voltage or current supplied to the load circuit.

10. The dynamic charge pump device as in claim 7, wherein after the output voltage of the charge pump is supplied to adjust the variation of voltage or current supplied to the load circuit, the detection circuit is further configured to detect whether a variation of voltage or current with time exceeds a predetermined value, if the variation of voltage or current with time does not exceed the predetermined value, the controlling signal is generated to control the reference voltage switching unit, such that at least one of the N reference voltage sources charges the first capacitor via the first end of the first capacitor, and that the output voltage of the charge pump supplied to the load circuit is increased to adjust the variation of voltage or current supplied to the load circuit.

\* \* \* \* \*